(12) United States Patent
Tanila et al.

(10) Patent No.: US 12,398,796 B2
(45) Date of Patent: Aug. 26, 2025

(54) MONITORING A GEAR WEAR IN AN ELECTRIC POWER TRAIN

(71) Applicant: ABB Schweiz AG, Baden (CH)

(72) Inventors: Teemu Tanila, Helsinki (FI); Olli Alkkiomäki, Helsinki (FI); Joni Siimesjärvi, Laihia (FI)

(73) Assignee: ABB Schweiz AG, Baden (CH)

( * ) Notice: Subject to any disclaimer, the term of this patent is extended or adjusted under 35 U.S.C. 154(b) by 348 days.

(21) Appl. No.: 18/189,666

(22) Filed: Mar. 24, 2023

(65) Prior Publication Data

US 2023/0313875 A1    Oct. 5, 2023

(30) Foreign Application Priority Data

Mar. 29, 2022    (EP) ..................... 22165107

(51) Int. Cl.
*F16H 57/01*    (2012.01)

(52) U.S. Cl.
CPC ....... *F16H 57/01* (2013.01); *F16H 2057/012* (2013.01)

(58) Field of Classification Search
CPC .......................... F16H 2057/012; F16H 57/01
See application file for complete search history.

(56) References Cited

U.S. PATENT DOCUMENTS

| | | | |
|---|---|---|---|
| 6,296,589 B1 * | 10/2001 | Ni | F16H 35/02 |
| | | | 475/221 |
| 11,490,576 B2 * | 11/2022 | Sanders | F16L 55/00 |
| 11,913,853 B2 * | 2/2024 | Chiu | G01M 13/021 |
| 2021/0389212 A1 | 12/2021 | Chiu | |
| 2022/0030785 A1 | 2/2022 | Miller et al. | |

FOREIGN PATENT DOCUMENTS

| | | |
|---|---|---|
| CN | 109632293 B | 7/2020 |
| DE | 102018125616 A1 | 5/2019 |
| DE | 102018215894 A1 | 3/2020 |

OTHER PUBLICATIONS

European Search Report and Annex to the Search Report; Application No. EP22165107; Completed: Sep. 9, 2022; 2 Pages.

* cited by examiner

*Primary Examiner* — Ramsey Refai
(74) *Attorney, Agent, or Firm* — Whitmyer IP Group LLC

(57) ABSTRACT

An electric power train includes an electric drive, an electric motor driven by the electric drive, and a meshing pair of a drive gear and a driven gear. The drive gear is coupled to the electric motor and the driven gear is coupled to a mechanical load. The backlash of the meshing pair of the drive gear and the driven gear is measured and estimated based on a time until a contact of teeth of the rotating drive gear and the driven gear during a startup of the electric motor. Wear of the meshing pair of the drive gear and the driven gear based on a change in the measured backlash over time during the operation of the electric power train.

20 Claims, 6 Drawing Sheets

MONITORING A GEAR WEAR IN AN ELECTRIC POWER TRAIN

TECHNICAL FIELD

The present invention relates to a condition monitoring, and particularly to a condition monitoring of electric power trains.

BACKGROUND

Power transmission systems oftentimes rely on gears to vary speed and torque as needed. A typical power train can have a VFD driving a motor and the motor's shaft connected to a gearbox further down the line. There are multiple individual parts which can cause stoppage of the entire system so proper usage and maintenance actions are in critical role to prevent unplanned losses in operation time.

Gears and cogwheels tend to wear out over time. Teeth are grinding against each other which will erode the tooth material making it thinner and weaker. It will introduce backlash between the gears and will eventually lead to a total failure of the system when teeth break down.

Wear out of gear teeth happens slowly over millions of cycles. As it is typically a very slow process, it might go unnoticed and cause sudden breakage in a power train without prior warnings unless preventive maintenance has been done periodically.

In a worst case, a cracking gear tooth can damage and break other surrounding equipment as well. If the application is critical for business, any unplanned downtime will lead to a significant loss in production. Manual inspection of a gear condition can be impractical due to sheer volume of installed equipment and gears being located in housings or otherwise hard to reach areas.

Installing auxiliary sensors to monitor the equipment condition adds another layer of costs and complexity so optimally we would like to have the needed monitoring features as a part of the already required equipment.

SUMMARY

An object of the present invention is to provide a new method and an apparatus for monitoring gear teeth wear. The object of the invention is achieved by a method, an electric drive and a server as recited in the independent claims. The preferred embodiments of the invention are disclosed in the dependent claims.

According to a first aspect of the invention is a method of monitoring a gear wear in an electric power train, wherein the power train includes an electric drive, an electric motor driven by the electric drive, and a meshing pair of a drive gear and a driven gear, wherein the drive gear is provided on a first gear shaft coupled to the electric motor and the driven gear is provided on a second gear shaft coupled to a mechanical load, the method comprising,
  measuring a backlash of the meshing pair of the drive gear and the driven gear until a contact of teeth of the rotating drive gear and the driven gear the during a startup of the electric motor during an operation of the electric power train, and
  monitoring wear of the meshing pair of the drive gear and the driven gear based on a change in the measured backlash over time during the operation of the electric power train.
In an embodiment, the contact of the of teeth of the rotating drive gear and the driven gear is detected by detecting a change in at least one electrical quantity of the electric motor and/or the electric drive due to an increased torque caused by the contact.

In an embodiment, the at least one electrical quantity includes one or more of: an electric power output to the electric motor; a current supplied to the electric motor; at least one motor phase current or a further electrical quantity derived or estimated therefrom; at least on motor phase voltage or a further electrical quantity derived or estimated therefrom; a motor torque; and a motor stator flux.

In an embodiment, a detection threshold or a detection reference for the at least one electrical quantity is determined by measurements, when the meshing pair of the drive gear and the driven gear is first time coupled to the electric motor.

In an embodiment, the measuring comprises
  starting the electric motor to rotate the drive gear from a stationary position,
  detecting a contact of teeth of the rotating drive gear and the driven gear,
  measuring a time or distance until the detected contact; and
  estimating the backlash of the meshing pair of the drive gear and the driven gear based on the measured time or distance values.
In an embodiment, the measuring comprises
  starting the electric motor to rotate the drive gear from a stationary position to a first direction,
  detecting a first contact of teeth of the rotating drive gear and the driven gear in the first direction,
  in response to detecting the first contact, starting the electric motor to rotate the drive gear from a stationary position to an opposite second direction,
  detecting a second contact of teeth of the rotating drive gear and the driven gear in the opposite second direction,
  measuring time or distance in the opposite second direction from the detected first contact to the detected second contact, and
  estimating the backlash of the meshing pair of the drive gear and the driven gear based on based the measured time or distance values.
In an embodiment, the monitoring comprises
  determining a gear wear condition by comparing each measured backlash or statics of a plurality of the measured backlashes collected over time to a backlash reference, and
  concluding a need for gear maintenance, if the comparison indicates an excessive wear or backlash of the meshing pair of the drive gear and the driven gear, and optionally
  providing a notification of the need for gear maintenance.
In an embodiment, the backlash reference comprises one or more of: a reference value, a reference range of values, and a reference distribution of values, a reference model, mean value, a value range, a maximum value, a maximum value range.

In an embodiment, the backlash reference is determined by measuring a plurality of backlash values, when the meshing pair of the drive gear and the driven gear is first time coupled to the electric motor.

In an embodiment, the measuring and monitoring are performed by the electric drive.

In an embodiment, the measuring is performed by the electric drive, and raw or preprocessed measurement results are forwarded to a further processing entity for completing the monitoring, the further processing entity preferably comprising a local condition monitoring entity and/or a cloud-based condition monitoring server.

A second aspect of the invention is an electric drive for driving an electric motor coupled to a meshing pair of a drive gear and a driven gear in an electric power train, wherein the drive gear is provided on a first gear shaft coupled to the electric motor and the driven gear is provided on a second gear shaft coupled to a mechanical load, wherein the electric drive comprises means for carrying out the measuring a backlash of the meshing pair of the drive gear and the driven gear according to the first aspect of the invention.

In an embodiment, the electric drive further comprises means for carrying out the monitoring wear of the meshing pair of the drive gear and the driven gear according to the first aspect of the invention.

In an embodiment of the invention, the electric drive further comprises means for forwarding raw or preprocessed measurement results to a further processing entity for completing the monitoring according to the first aspect of the invention, the further processing entity preferably comprising a local condition monitoring entity and/or a cloud-based condition monitoring server.

In an embodiment, the electric drive is a variable frequency drive, VDF.

In an embodiment, the electric drive is a servo drive.

A further aspect of the invention is a cloud-based condition monitoring server, comprising means for carrying out the monitoring wear of the meshing pair of the drive gear and the driven gear according to the first aspect of the invention based on raw or preprocessed measurement results forwarded from the electric drive according to the second aspect of the invention.

An advantage of the invention is that a firmware in a variable speed drive (VSD), such as variable frequency drive (VFD), can be used for monitoring gear condition from estimated backlash. In a baseline measurement, a reference for backlash between gears is recorded in the beginning. Observing changes in the momentum or torque needed to rotate the gears will enable to identify when gears are engaged and when not. The amount of backlash can be monitored by monitoring the time it takes for the gears to contact or engage, which will allow to calculate the actual wear over time and estimate the gear condition. By establishing a baseline at the beginning of condition monitoring, an increase in the backlash over time can be observed. This would indicate eroding gear teeth, decreasing material strength, and fatigue, for example. Depending on the rate of change in backlash it can also be observed if there are issues with lubrication, such as abrasive substances which would accelerate the erosion process. This allows preventive maintenance before a complete breakdown.

BRIEF DESCRIPTION OF THE DRAWINGS

In the following the invention will be described in greater detail by means of preferred embodiments with reference to the attached drawings, in which.

DETAILED DESCRIPTION

Figure 1:
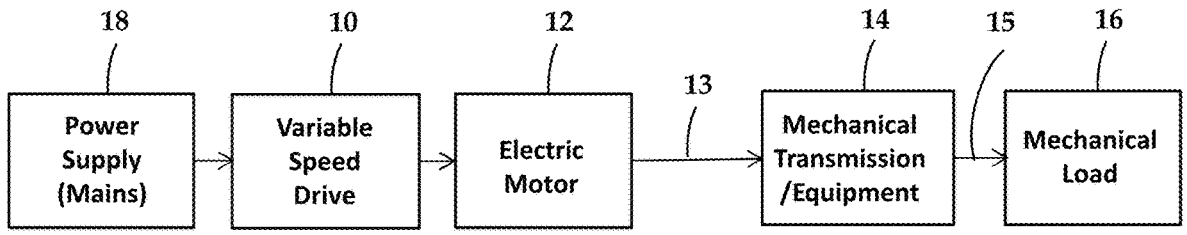
FIG. 1 illustrates schematically a simplified example of an electrical powertrain.

Throughout industry, infrastructure and buildings there is a need to drive conveyor belts, operate pumps, turn mixers, move or process material, rotate fans, or any one of a thousand other tasks. These tasks are accomplished by electrical powertrains—that is, the connection of a number of drives, motors, bearings and couplings, gears and pumps, in different configurations. In an electric powertrain, the mechanical working machine or equipment needed for a mechanical task is driven by an electric motor, such as an AC or DC or servo motor. The electric motor can transform an electrical energy into a mechanical energy, which is then used to drive the mechanical working machine. A simplified example of an electrical powertrain schematically illustrated in FIG. 1 includes an electrical variable speed drive VSD (e.g. a DC drive, an AC drive, an inverter, a variable frequency drive, as servo drive) 10, an electric AC or DC motor 12, a mechanical power transmission or coupling (e.g. a gear, belt, pulley, brake clutch) 14, and a mechanical load or a working mechanical machine (e.g. a pump, fan compressor, conveyor, crusher) 16 to which the mechanical power is transmitted. Energy is supplied to the drive system from a power supply 18 (e.g. 2-phase and 3-phase AC mains voltages, a DC power supply, a battery).

A typical power train can have an electric motor 12 coupled to a gearbox 14 further down the line. Gears are key components of power transmission. A gear can be defined as a toothed wheel which, when meshed with another toothed wheel with similar configuration, will transmit rotation from one shaft to another. A system of gears can be arranged to modify the speed and direction of a rotation or the amount of torque (and inertial load) which is transmitted between the electric motor and the driven machine. The speed can be either reduced or increased. When speed is reduced, torque is increased and vice versa. A gearbox can also be used to change the direction of a shaft, e.g. worm gear for right angle application. A gearbox may further be used to change the direction of shaft rotation, e.g. from clockwise to counterclockwise. There are many types of gears, such as spur gears, helical gears, bevel gears, worm gears, rack and pinion gears, etc. A pair of meshed gears is the basic form of a single-stage gear train. A two-stage gear train uses two single-stages in series. In exemplary embodiments illustrated herein one-stage spur gears are shown but the invention is not limited to any specific type of gears.

Figure 2:
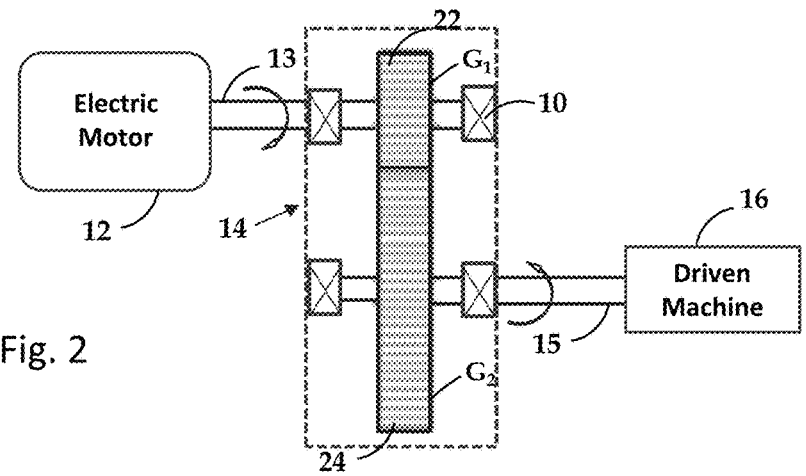
FIG. 2 is a schematic simplified illustration of a one-stage speed reducing gearbox according to an exemplary embodiment.

In FIG. 2, a one-stage speed reducing gearbox 14 according to an exemplary embodiment is shown that comprises a pair of meshing gears G1 and G2. The gears G1 and G2 are mounted on gear shafts 13 and 15, and bearings 10 are provided to support the shafts. The drive gear G1 is arranged on a first gear shaft 13 coupled to a motor shaft of the electric motor 12 so that it rotates with the rotating motor shaft. The driven gear G2 is arranged on a second gear shaft 15 coupled to a driven mechanical load 16, such a driven machine 16. The gearbox housing generally contains some form of lubricant (e.g. oil or grease) to lubricate the gears and bearings.

Figure 3:
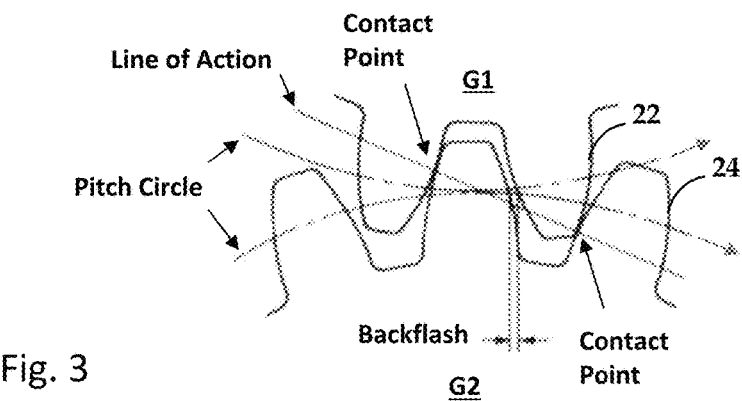
FIG. 3 illustrates a section of a pair of meshing gears.

Most generally, gear teeth 22, 24 are equally spaced around the periphery of the gear G1, G2. A drive gear G1 works by engaging its peripheral teeth 22 with those 24 of the driven gear G1, allowing rotary power to be transferred from the drive gear G1 to the driven gear G2. FIG. 3 illustrates a section of a pair of the meshing gears G1 and G2. Pitch circle is the imaginary circle on the gear about which it may be supposed to roll without slipping with pitch circle of another gear. When a pair of involute gears is meshed, the contact occurs on the line of action and the contact point moves along the line of action. The point of contact is the point where gear teeth will come into actual physical contact with one another, and it provides just enough contact so that when the drive gear G1 turns in one direction, say counterclockwise, its teeth 22 exert pressure upon the driven gear teeth 24, forcing the driven gear G2 to move in the opposite direction, e.g. clockwise. To obtain correct tooth action, (constant instantaneous relative motion between two engaging gears), the tooth profile plays an important role. Many modern gears use a special tooth profile called an involute. This profile has the very important property of maintaining a constant speed ratio between the two gears. On an involute profile gear tooth, the contact point starts closer to one gear, and as the gear spins, the contact point moves away from that gear and toward the other. When a pair of involute gears is meshed, the contact occurs on a line of action and the contact point moves along the line of action that starts near one gear and ends up near the other. This means that the radius of the contact point gets larger as the teeth engage. As the teeth first start to engage, the thicker bottom portion of the tooth 22 of the drive gear G1 contacts the top narrower of the tooth 24 of the driven gear G2. As the gears G1 and G2 turn further, the contact point slides down onto the narrower top portion of the drive gear G1 and onto the thicker bottom portion of the driven gear tooth 24. As a result, the driven gear G2 is pushed ahead at a constant ratio of rotational speed.

When the gears mesh, there is actually a tiny gap between the gears. Backlash refers to the play, or clearance, between gear teeth of meshing gears, as illustrated in FIG. 3. Backlash may be measured in units of length, but it is often measured in degrees or arc minutes or arc seconds. Backlash is necessary for several reasons. First, gear manufacturing is not 100% perfect. Manufacturing tolerances, bearing dimensions, thermal considerations, and other practical considerations contribute to this inaccuracy. Other reasons are to leave space for lubricants, reduce friction in the gears, and/or allow for metal expansion.

Like all mechanical components, gears can and do fail in service for a variety of reasons. In most cases, except for an increase in noise level and vibration, total gear failure is often the first and only indication of a problem. Many modes of gear failure have been identified, for example fatigue, impact, wear or plastic deformation of gear tooth. Teeth are grinding against each other which will erode the tooth material making it thinner and weaker. It will eventually lead to a total failure of the system when teeth break down. Wear out of gear teeth happens slowly over millions of cycles. As it is typically a very slow process, it might go unnoticed and cause a sudden breakage in a power train without prior warnings unless a preventive maintenance has been done periodically. In prior art, predictive monitoring of gear wear or teeth wear is generally based on monitoring noise level or vibration of the gears by sensors.

Figure 4A:
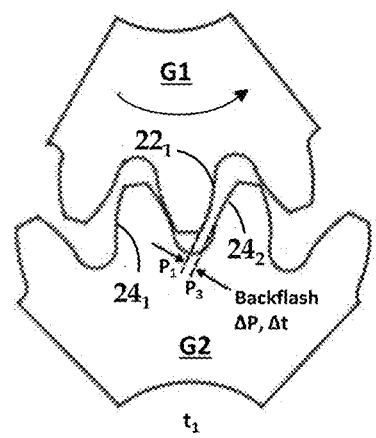
FIGS. 4A, 4B and 4C illustrates a section of a pair meshing gears in three different teeth position during a startup.
Figure 4B:
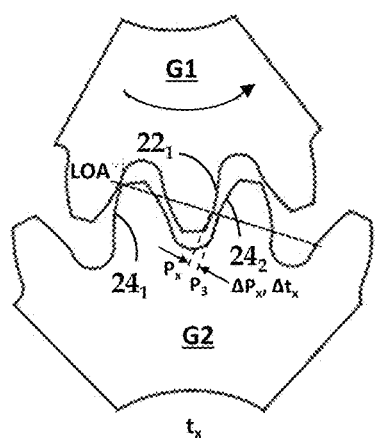
Figure 4C:
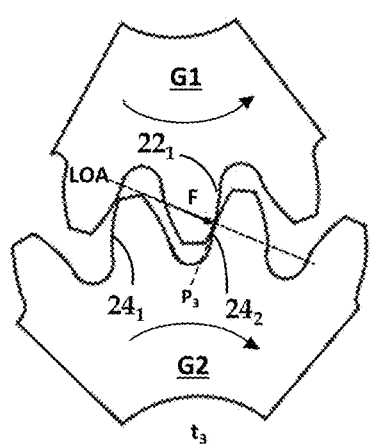

According to an aspect of the invention, wear of meshing gears can be monitored by monitoring the change in the backlash of the meshing gears. The clearance or backlash between teeth of a pair of meshing gears will increase with increasing wear of the gear teeth. On the other hand, the backlash or clearance appears as movement of a rotating drive gear while a driven gear is stationary until the drive gear contacts the stationary driven gear during a startup, as illustrated in FIGS. 4A, 4B and 4B. Referring to FIG. 4A, let us assume a starting position at time $t_1$ where the drive gear G1 and the driven gear G2 are stationary at a reverse pitch point, i.e. with a left flank of a tooth 221 of the drive gear G1 contacting a right flank of a tooth 241 of the driven gear G2. In the illustrated starting position, it can be said that the distance or clearance $\Delta P$ between a position $P_1$ of a right flank of the tooth 221 of the drive gear G1 and a position $P_3$ of a left flank of next tooth 242 of the driven gear G2 corresponds to the actual backlash. The drive gear G1 starts to rotate counterclockwise while the driven gear G2 is stationary, so that the tooth 221 of the drive gear G1 moves away from the tooth 241 and towards the next tooth 242 of the driven gear G2, as illustrated at time $t_x$ and a position $P_x$ in FIG. 4B. Finally, as illustrated in FIG. 4C, the right flank of tooth 221 of the drive gear G1 will contact the left flank of next tooth 242 of the driven gear G2 at time $t_3$ and a position $P_3$, and the drive gear teeth 221 will start to exert pressure F upon the driven gear teeth 242, forcing the driven gear G2 to start rotating rotate clockwise. In the reverse direction of rotation, when the gear G1 rotates clockwise and the gear G2 rotates counterclockwise, the operation of the pair of meshing gears G1 and G2 is similar but in opposite order to that shown in FIGS. 4A-4C. In many applications the pair of meshing gears G1 and G2 are driven in both directions of rotation.

As the backlash increases due to wear of the meshing gears over the time, the movement of the driven gear G1 will be longer in distance $\Delta P$ and take a longer time $\Delta t$ until the teeth of the meshing gears G1 and G2 make contact at time t3 during a startup, A relative change in the measured time-to-contact $\Delta t$ or distance-to-contact $\Delta P$ is representative of a relative change in the backlash of the meshing gears over the time during the operation. Therefore, according an aspect of the invention, the amount of backlash or wear of meshing gears can be monitored by measuring and monitoring the time $\Delta t$ or distance $\Delta P$ until the teeth of the meshing gears make contact during a startup. When the monitored time $\Delta t$ or distance $\Delta P$ or the corresponding backlash changes over the time so that predetermined criterion is met, an alarm signal may be triggered. For example, the monitored time $\Delta t$ or distance $\Delta P$ or the corresponding backlash may be compared with a reference value or a threshold value for, an alarm signal may be triggered if the threshold value was exceeded or there is a predetermined deviation from the reference value. The backlash of new meshing gears may not be known before installation. In an embodiment, when having a new pair of meshing gears installed, the monitored time $\Delta t$ or distance $\Delta P$ or the corresponding backlash during a startup can be measured and considered as a reference, or it may be used for calculation of a threshold for the new pair of gears. Preferably, statistics of multiple values measured during multiple startups may be collected and used as reference statistics or for calculating reference value, a reference model or a reference distribution such as a distribution of values, mean value, a value range, a maximum value, a maximum value range.

As discussed above referring to FIG. 2, the drive gear G1 is arranged on a first gear shaft 13 coupled to and driven by the electric motor 12. The electric motor 12 should deliver the required mechanical power that depends on the torque and rotating speed required by the mechanical load 16. Torque is the rotating force supplied from the electric motor to the mechanical load. In order to move a stationary load a torque must be applied, likewise a rotating load may be accelerated or decelerated by applying torque in the suitable rotational direction. The torque required to start moving a stationary load is typically much higher than the torque required once a load is rotating, but is however, only required for a short initial period to get the load moving. The greater is the speed or the torque required, the greater is the mechanical power required. This has a direct effect on how much electric power the electric motor 12 draws from the electric power supply 18.

According to an aspect of the invention, a contact of teeth of a pair of meshing gears G1 and G2 during a startup is detected by an electric variable speed drive (VSD) (e.g. a DC drive, an AC drive, an inverter, a variable frequency drive, a servo drive) 10 that controls the electric motor 12 and the electric power input to the electric motor 12. In the beginning of startup before the contact (during the time-to-contact Δt, the electric motor 12 needs rotate only the "unloaded" drive gear G1, meaning that the motor torque needed for rotating is smaller in relation the starting torque after the contact. At time t3 of the contact of teeth of meshing gears G1 and G2, the electric motor 12 is additionally loaded by the driven gear G2 and the mechanical load (the driven machine) 16 coupled thereto, thereby a relatively higher motor torque is required. Thus, the contact of the gear teeth can be detected based a relative change in a motor torque required or a relative change in an electric power output from the electric variable speed drive 10 to the electric motor 10. Thus, a change in a motor torque due to a gear teeth contact can be estimated or calculated based on a change in one or more of electrical quantities of the VDS and the electric motor, e.g. a change in the electric power output to the electric motor or a change in the measured current supplied to the electric motor. It should be appreciated that the monitored electrical quantity need not to be any accurate value representing the motor torque or the power output, it is sufficient that a relative chance due to the gear teeth contact during the startup can be coarsely detected. In an embodiment, a threshold value or a deviation of the monitored electrical quantity maybe determined by measurements when a new pair of gears is coupled to the electric motor.

According to an embodiment of the invention, the gear teeth contact during the startup is detected by monitoring or measuring the motor current driving the motor. According to an embodiment of the invention, the gear teeth contact during the startup is detected by monitoring or measuring the electrical power supplied to the motor. The electric power is derived the motor voltage and the motor current driving the motor. For most motors, torque is directly proportional to the current and can be derived from it by knowing shaft speed and motor efficiency. During a startup until the contact the shaft speed is low and can be readily estimated, if needed. The current or power measurement is considered an indirect measurement of torque since it is a relation from electrical quantities to a theoretical and estimated torque value. The accuracy is poor but sufficient for the purposes of the present invention where only a "gross" torque measurement is needed to detect a relative change in the motor torque.

Figure 5:
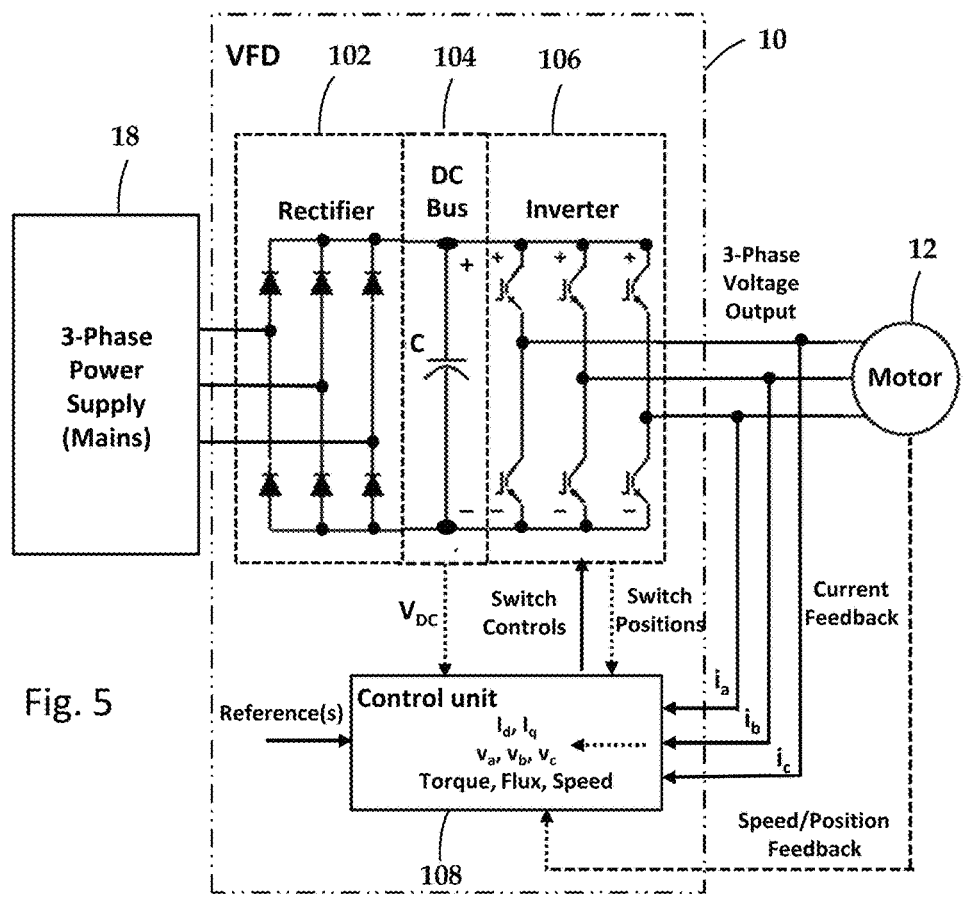
FIG. 5 shows a basic block diagram that illustrates an example of a variable frequency drive (VFD)

FIG. 5 shows a basic block diagram that illustrates an example of a variable frequency drive (VFD) 10. Whilst there are a number of variations in variable frequency drive design; they all offer the same basic functionality which is to convert the incoming AC electrical supply of fixed frequency and voltage into a variable frequency and variable voltage that is output to the motor with a corresponding change in the motor speed and torque. The basic design may comprise four elements: a rectifier 102, an intermediate circuit (also referred to as a DC bus) 104, an inverter 106, and a control unit 108. The rectifier 102 converts the incoming alternating current (AC) supply (typically 3-phase mains voltage) into direct current (DC). The rectified DC supply is then conditioned (filtered) in the intermediate circuit 104, normally by a capacitor C or a combination of inductors L and capacitors C, providing a fixed-voltage DC bus. The inverter 106 converts the rectified and conditioned DC back into an AC supply supplied to the AC electric motor 12. The inverter 106 may comprise six semiconductor switches (such as IGBT switches) switched on and off to connect each motor phase either to the negative or the positive DC bus according to a certain switching sequency or pattern, thereby creating a three phase AC output to the AC electric motor 12. The control unit 108 controls the operation of the variable frequency drive VFD 10, particularly it monitors and controls the switching of the switches of the inverter 106 to deliver the correct output in response to an external control, such as speed and/or torque reference. The control unit 108 may comprise one or more microprocessors or digital signal processors (DSP) having associated electronic memory to store program code and data, as well as a communication interface for wireless or wired data communication. The control unit 108 may be programmed and configured to use various control methods to control the switching, such as a scalar control, a vector control or field-oriented control (FOC), and a direct torque control (DTC).

In the scalar control scheme, the frequency (f) and the voltage level (V) of the supplied voltage, or the ratio V/f, can be controlled. The V/f ratio, also referred to as V/Hz ratio, determines the magnetic flux density. Keeping a constant U/f ratio and thereby constant magnetic flux density, an optimum and constant torque can be obtained for the motor load; that is, as the frequency is reduced from the nominal value, the voltage is reduced in proportion. The control unit 108 contains a pulse-width-modulator (PWM) to convert the voltage and frequency demand into the necessary control pulses to drive the switches in the inverter 106. There is no feedback in the scalar control, i.e. it is an open-loop control. However, the control unit 108 may be configured to measure one or more of the motor phase currents $i_a$, $i_b$, $i_c$ for other purposes, for example to protect the motor and drive from overload currents. In embodiments of the invention, one or more of measured motor phase currents or a further electrical quantity derived or estimated therefrom may be monitored to detect the gear teeth contact during the startup using a scalar control VFD drive.

In the vector control or field-oriented control (FOC) scheme, a stator current vector is controlled with respect to a flux vector position. That is, the amplitude, frequency, and phase of the AC voltage supply to the motor 12 is controlled to keep the motor speed as desired. The three-phase AC voltage as a phasor is generated to control the three-phase stator current as a phasor, which in turn controls the rotor flux vector and rotor current phasor independently. The vector control can be a closed-loop or open-loop control. A closed-loop vector control requires an encoder feedback that provides motor speed or position measurement to the control unit. Such motor speed or position feedback is typically inherently available in a servo drive driving an electric servo motor, for example in robotics. In the open-loop vector control (also referred to as sensorless vector control) the control unit 108 uses a mathematic model of the motor operating parameters, rather than using a physical feedback device. The control unit 108 measures the 3-phase currents $i_a$, $i_b$, $i_c$ from the motor 12 and transforms (e.g. by means of Park transformation) the 3-phase currents in a stationary reference frame to a 2-phase flux current component $i_d$ and torque-producing current component $i_q$ with a rotating reference frame. This allows that the torque-producing current $i_q$ can be independently controlled to ensure maximum torque production. The control unit 108 compares the measured currents $i_d$ and $i_q$ to reference currents $i_d$ and $i_q$ obtained by the mathematical model and calculates reference voltages for currents $i_d$ and $i_q$. The reference voltages are transformed back into a 3-phase system in a stationary reference calculate the duty cycles for controlling the switching of the semiconductor switches of the inverter to adjust the AC voltage supply to the motor 12 and thereby the motor current. With the sensorless vector control, it is important to have a very accurate mathematical model of the motor, and the controller is typically be tuned with measurements for proper operation, when it is connected to the motor. In embodiments of the invention, one or more of measured 3-phase motor currents, or one or more of transformed 2-phase flux current and torque-producing current, or a further electrical quantity derived or estimated from the transformed 2-phase flux current and torque-producing current may be monitored to detect the gear teeth contact during the startup using a vector control VFD drive.

Direct torque control (DTC) scheme controls the flux and torque (and thus finally the speed) of the AC electric motor 12 directly. Two of the motor phase currents $i_a$, $i_b$ and the DC bus voltage $V_{DC}$ are measured, along with switch positions of the inverter 106. Motor voltages $v_a$, $v_b$, $v_c$ are determined from the DC bus voltage $V_{DC}$ and the switch positions of the inverter 106. The control unit 108 comprises a mathematical model of the electric motor 12 that is used to calculate and produce exact values of the stator flux and motor torque, along with shaft speed, based on the measured voltage and currents. The actual torque and flux values are fed to the torque and flux comparators, which compare them to torque and flux reference values that are provided by a speed control loop. Based on the comparison an optimum voltage vector is chosen based on three parameters: whether torque and stator flux each need to be increased or decreased (or, for torque, held constant), and in which sector (60-degree segment) of the space vector plane the stator flux resides. Based on the chosen voltage vector, the control unit 108 controls the switching of the semiconductor switches of the inverter 106 to maintain or change the motor torque as required. In embodiments of the invention, one or more of measured motor phase currents or voltages, or one or more of the produced torque and flux values may be monitored to detect the gear teeth contact during the startup using a DTC drive.

Figure 6:
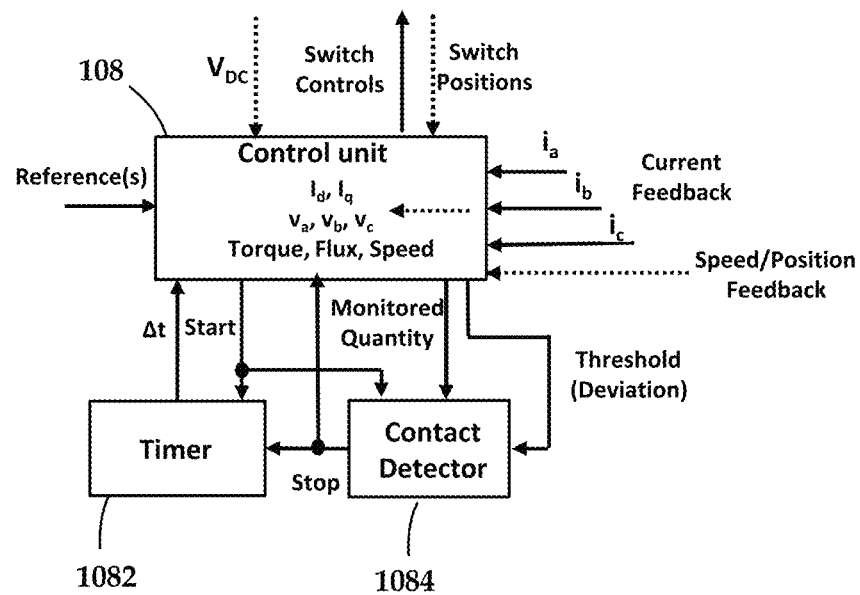
FIG. 6 shows a functional block diagram illustrating a contact detection block according to exemplary embodiment of the invention.

FIG. 6 shows a functional block diagram illustrating a contact detection block according to exemplary embodiments of the invention in connection with the control unit 108 of the VDF described with reference to FIG. 5. The control unit 108 is arranged to input values of a monitored electrical quantity and a contact threshold value or a threshold deviation to a contact detector 1084. In beginning of the startup, the control unit 108 launches a start command to trigger a timer 1082 and the contact detector 1084. In response to the start command, the contact detector 1084 compares the received values of the monitored electrical quantity until the threshold value is reached or until the value of the monitored electrical quantity has changed from the initial value by the amount of the threshold deviation. When the threshold value or deviation is reached, a gear teeth contact is determined, and the contact detector 1084 launches a stop signal to the timer 1082 and optionally to the control unit 108. In response to the stop signal the timer 1082 stops and provides a measured start-to-stop time, i.e. a time-to-contact time Δt to the control unit 108. The control unit 108 may then store and process the time-to-contact time(s) Δt to monitor a backlash and/or wear of the pair of the meshing gears according to embodiments of the invention.

At startup of the electric motor 12, the exact starting position of the tooth $22_1$ of the drive gear G1 is typically not known but the tooth $22_1$ may have any random position at and between the positions illustrated in FIGS. 4A and 4C, depending on where the previous rotation cycle ended. Most likely, the tooth $22_1$ located somewhere between as illustrated in FIG. 4B. Therefore, if the starting position is not known, it may require multiple measurements during multiple startups to create a distribution for estimated backlash.

Figure 8:
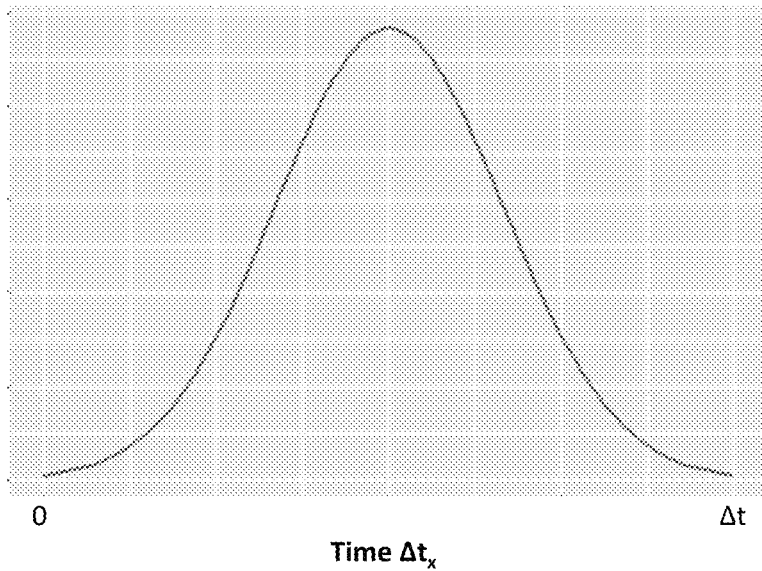
FIG. 8 shows a graph illustrating an example of a density distribution model for estimated time required to overcome the backlash during a startup.
Figure 7:
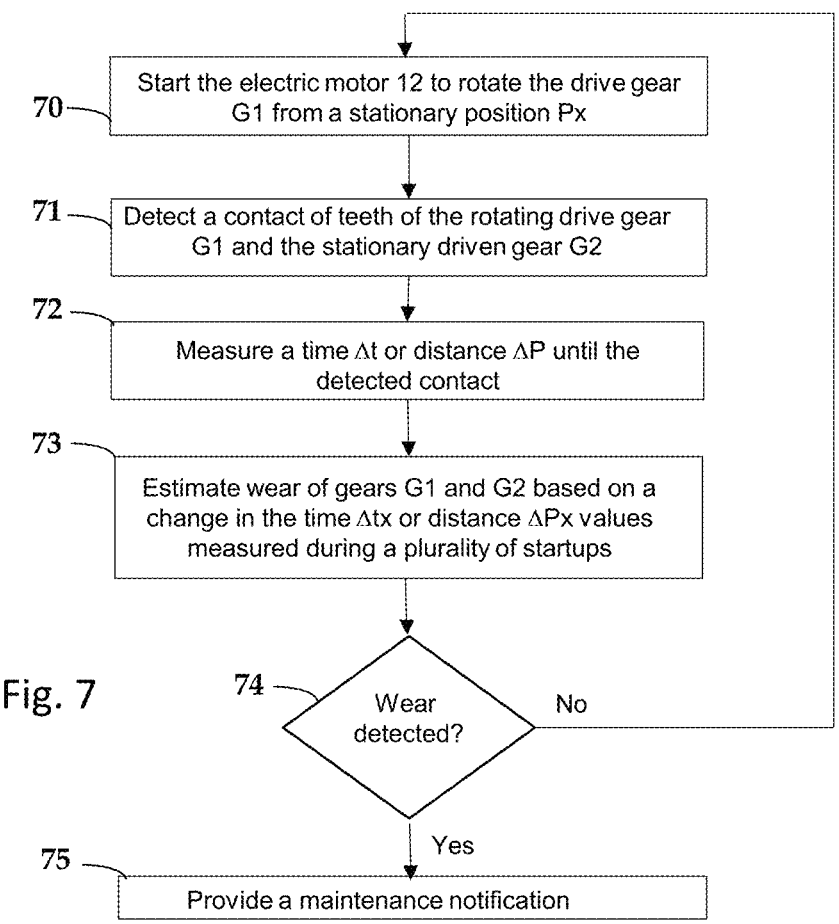
FIG. 7 shows a flow chart illustrating an exemplary monitoring method according to an embodiment of the invention.

In embodiments embodiment of an aspect of the invention, as illustrated by an exemplary flow chart in FIG. 7, a monitoring method comprises the control unit 108 starting (70) the electric motor 12 to rotate the drive gear G1 from a stationary position to a first direction during a startup of the electric motor 12 during an operation of the electric power train. The control unit 108 may supply the start command to start the contact detector 1084 and the timer 1082. For example, the gear G1 may be rotated from position Px shown in FIG. 4B to the position P3 shown in FIG. 4C. Upon detecting (71) a contact of teeth $22_1$ and $24_2$ of the rotating drive gear G1 and the driven gear G2, the contact detector 1084 may launch a stop signal to the timer 1082 and the control unit 108. The timer 1082 has measured (72) a time Δt until the detected contact during the startup and may output the measured time Δt to the control unit 108. The detection and measurement of the time $Δt_x$ or distance $ΔP_x$ value is repeated during multiple startups, possibly during each startup, of the motor 12. The startup from any unknown backlash position allows performing the wear estimation in parallel with a normal startup procedure of the motor 12, without causing delay to the startup. Wear of the meshing pair of the drive gear G1 and the driven gear G2 can estimated based on a change in the time $Δt_x$ or distance $ΔP_x$ values measured during the plurality of startups of the electric motor 12 during the operation of the electric power train. As a starting position during an individual startup is not known, the high number of measured values from a plurality of startups enables to collect statistics or create a statistical model for estimating time Δt or distance ΔP required to overcome the backlash during a startup. The measured values are distributed within a time range 0-Δt or a distance range 0-ΔP. In an embodiment, measured values are grouped into several subranges or bins within the time range or the distance range. Thereby a frequency distribution may be created that may be presented as a histogram. For a new pair of meshing gears installed, reference statistics, a reference value range, a reference model or a reference distribution for estimated time Δt or distance ΔP may be created, such as a density distribution function or a probability distribution function. An example of a density distribution model for estimated time Δt required to overcome the backlash during a startup is illustrated in FIG. 8. Once reference statistics, a reference model or a reference distribution for a new pair of gears have been collected or created, measurements made during subsequent startups during the operation of the pair of gears may be compared with the reference. As wear or backlash increases, more and more measured values exceeding or outside the reference will appear, as it will take longer to make the contact of gears on average. In an embodiment, if wear of gears requiring maintenance actions is detected (74), an alarm or a maintenance notification may be generated (75).

Figure 9:
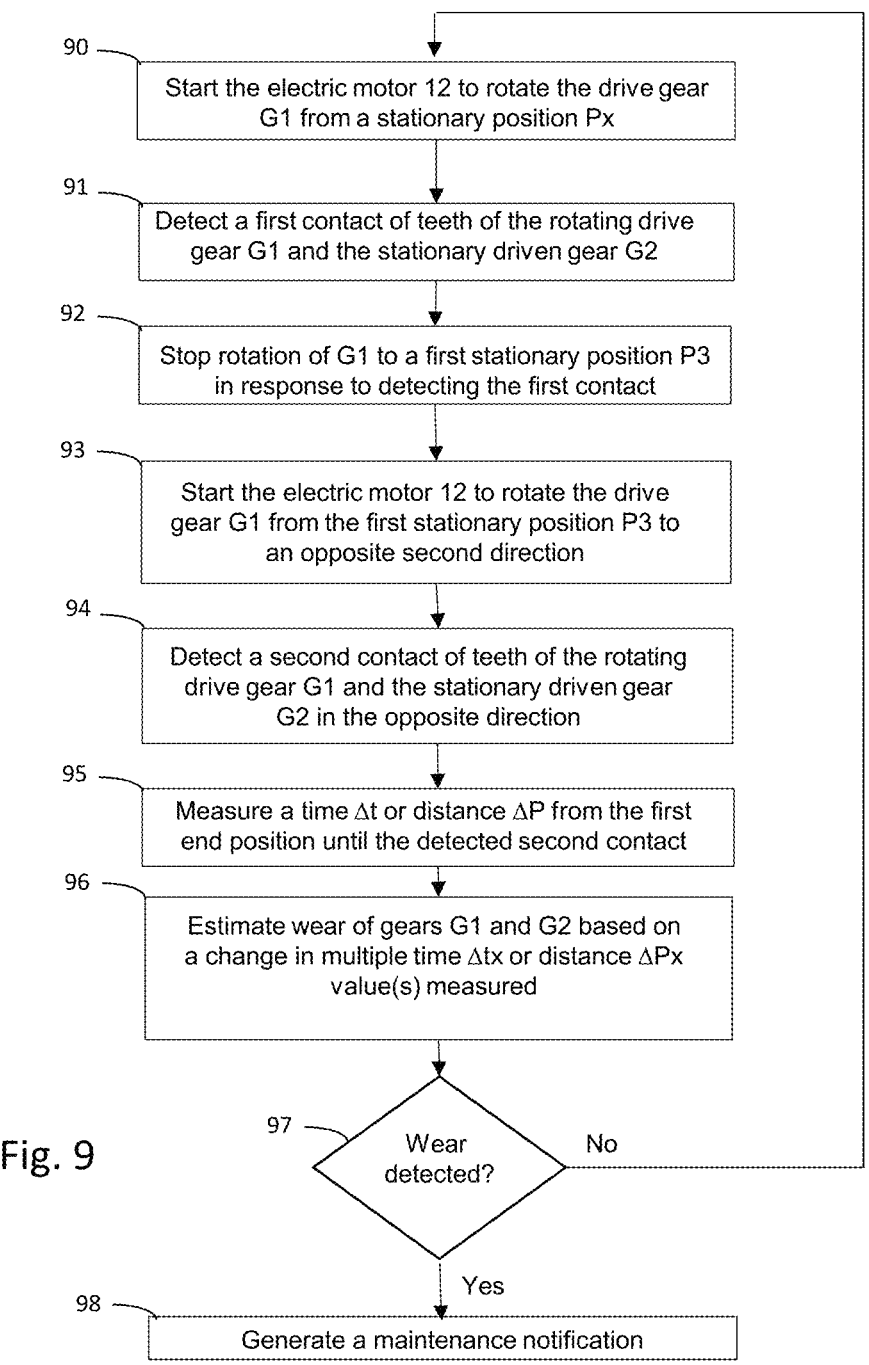
FIG. 9 shows a flow chart illustrating an exemplary monitoring method according to another embodiment of the invention.

In embodiments embodiment of another aspect of the invention, the VDS 10 may first drive a tooth of the drive gear to a contact position (e.g., a pitch point) on one side of clearance, detect the contact, the drive the tooth to a contact position (e.g., a pitch point) on the opposite side of the clearance, detect the contact, and measure the time between the two contacts. As this process starts to take longer, the VDS 10 can conclude that there has been increase in backlash and the power transmission system is in need of gear maintenance. This aspect is illustrated by an exemplary flow chart in FIG. 9, a monitoring method may comprise starting (90) the electric motor 12 to rotate the drive gear G1 from a stationary position to a first direction (e.g. counter-clockwise) and detecting (91) a first contact of teeth of the rotating drive gear G1 and the stationary driven gear G2 in the first direction during a startup of the electric motor 12. For example, the gear G1 may be rotated from position Px shown in FIG. 4B to the position P3 shown in FIG. 4C, i.e to one of the end positions, and stopped. The contact detector 1084 in FIG. 6 may now launch a stop signal to the timer 1082 and the control unit 108. The control unit 108 may disregard the time Δt outputted by the timer 1082. Instead, in response to detection the first contact, the control unit 108 will start (93) the electric motor 12 to rotate the drive gear G1 from the stationary end position P3 to an opposite second direction (e.g. clockwise), and may trigger the contact detector 1084 to detect (94) a second contact of teeth of the rotating drive gear G1 and the stationary driven gear G2 in the opposite direction and the measure (95) a time Δt from the first end position P3 until the detected second contact. Upon detecting the second contact, the contact detector 1084. 6 may launch a stop signal to the timer 1082 and the control unit 108, and the timer 1082 may output the measured time Δt. The control unit 108 may stop the rotation of motor 12 and the gear G1, or the startup and rotation may be continued normally. By detecting contacts at both end positions of the clearance or backlash, the measured time or distance between the end positions is directly proportional the actual amount of clearance and backlash. Wear of the gears G1 and G2 can be estimated (96) based on a change in the time Δt or distance ΔP value(s) measured. Again, if wear of gears requiring maintenance actions is detected (97), an alarm or a maintenance notification may be generated (98). A disadvantage of this approach may be that driving the drive gear G1 from an unknown position to one end of the backlash and reversing the direction of rotation is additional to the normal startup procedure of the motor and may cause undesired delay to the startup. On the other hand, since the measured time or distance between the end positions is directly proportional the actual amount of clearance and backlash, a lower number of measured values is needed for monitoring wear of the gears, and startups with the measurement can be made regular or irregular intervals among normal startups. The startup with the measurement can be made as a specific test startup that is not related to the normal operation of the power train. In embodiments, the same startup measurement is used for measuring a reference or references for the time Δt or distance ΔP, or generally to backlash or clearance, when a new pair of meshing gears is installed.

In embodiments of the invention, a controller in a variable speed drive (VSD) 10, such as the control unit 108 in the exemplary embodiments illustrated herein, is configured perform the backlash or wear estimation based on the measured data, detect the wear requiring a maintenance action, and provide a notification of a need for a gear maintenance to maintenance personnel and/or condition monitoring systems/devices.

Figure 10:
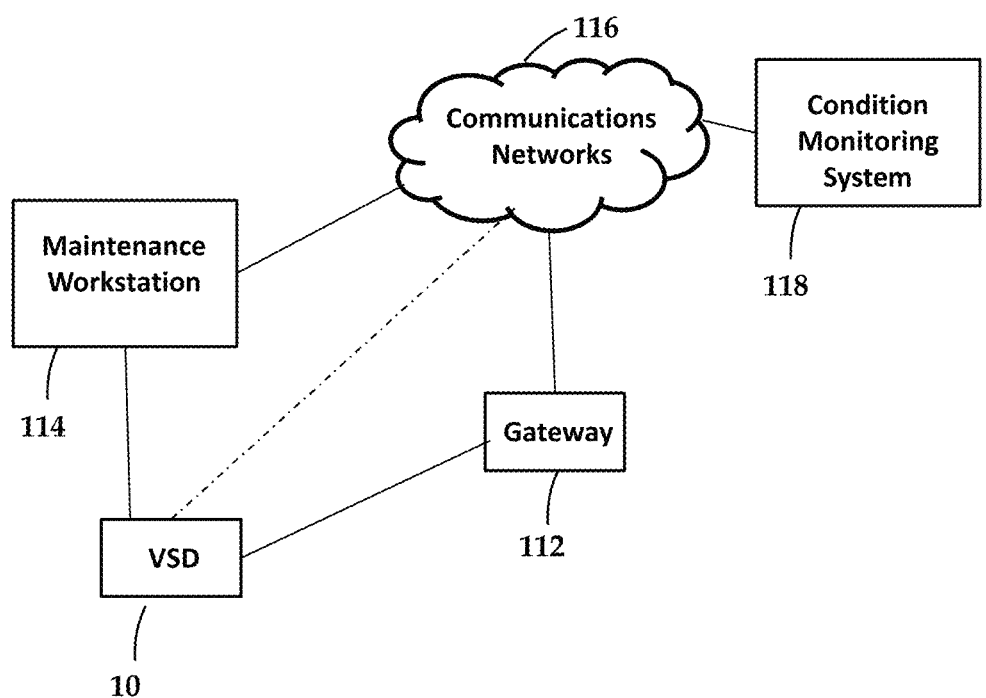
FIG. 10 illustrates an example of a condition monitoring system wherein embodiments of the invention may be applied.

In embodiments of the invention, a controller in a variable speed drive (VSD) 10, such as the control unit 108 in the exemplary embodiments illustrated herein, is configured to a measure and collect of the backlash or clearance data, e. g. the time-to-contact data Δt or the distance-to-contact data ΔP, and to forward or send the measured data to a further local or remote processing device or system for the wear estimation and detection. The data may be sent over a direct communication link, over a gateway 112, and/or over communications network(s) 16 as illustrated by a block diagram shown in FIG. 10. A local processing device/system may be, for example, a maintenance and condition monitoring workstation/device/system 114, or a special-purpose condition monitoring gateway 112. A remote processing device/system may be a remote condition monitoring system, such a cloud-based condition monitoring server 118. The data processing related to the wear estimation and detection may be distributed among two or more entities, such as the VSD 10, gateway 112, and the condition monitor server 118. A controller of a VSD 10, such as the control unit 108, may forward raw backlash measurement data (e.g. time Δt or distance ΔP data), or it may process the measured data before sending data forward, such as perform a preliminary wear estimation, data analysis or data filtering.

The techniques described herein may be implemented by various means. For example, these techniques may be implemented in hardware (one or more devices), firmware (one or more devices), software (one or more modules), or combinations thereof. For a firmware or software, implementation can be through modules (e.g., procedures, functions, and so on) that perform the functions described herein. The software codes may be stored in any suitable, processor/computer-readable data storage medium(s) or memory unit(s) and executed by one or more processors/computers. The data storage medium or the memory unit may be implemented within the processor/computer or external to the processor/computer, in which case it can be communicatively coupled to the processor/computer via various means as is known in the art. Additionally, components of systems described herein may be rearranged and/or complimented by additional components in order to facilitate achieving the various aspects, goals, advantages, etc., described with regard thereto, and are not limited to the precise configurations set forth in a given figure, as will be appreciated by one skilled in the art.

The description and the related figures are only intended to illustrate the principles of the present invention by means of examples. Various alternative embodiments, variations and changes are obvious to a person skilled in the art on the basis of this description. The present invention is not intended to be limited to the examples described herein but the invention may vary within the scope and spirit of the appended claims.

The invention claimed is:
1. A method of
monitoring a gear wear in an electric power train, wherein the power train includes an electric drive, an electric motor driven by the electric drive, and a meshing pair of a drive gear and a driven gear, wherein the drive gear is provided on a first gear shaft coupled to the electric motor and the driven gear is provided on a second gear shaft coupled to a mechanical load, the monitoring the steps of:
measuring a backlash of the meshing pair of the drive gear and the driven gear until a contact of teeth of the rotating drive gear and the driven gear during a plurality of startups of the electric motor during an operation of the electric power train, and
monitoring wear of the meshing pair of the drive gear and the driven gear based on a change in the measured backlash of the plurality of startups over time during the operation of the electric power train.

2. The method as claimed in claim 1, wherein the contact of the of teeth of the rotating drive gear and the driven gear is detected by detecting a change in at least one electrical quantity of the electric motor and/or the electric drive due to an increased torque caused by the contact.

3. The method as claimed in claim 2, wherein the at least one electrical quantity includes one or more of: an electric power output to the electric motor; a current supplied to the electric motor; at least one motor phase current or a further electrical quantity derived or estimated therefrom; at least one motor phase voltage or a further electrical quantity derived or estimated therefrom; a motor torque; and a motor stator flux.

4. The method as claimed in claim 2, wherein a detection threshold or a detection reference for the at least one electrical quantity is determined by measurements, when the meshing pair of the drive gear and the driven gear is first time coupled to and driven by the electric motor.

5. The method as claimed in claim 1, wherein the measuring comprises
starting the electric motor to rotate the drive gear from a stationary position,
detecting a contact of teeth of the rotating drive gear and the driven gear, measuring a time or distance until the detected contact; and
estimating the backlash of the meshing pair of the drive gear and the driven gear based on the measured time or distance values.

6. The method as claimed in claim 1, wherein the measuring comprises
starting the electric motor to rotate the drive gear from a stationary position to a first direction,
detecting a first contact of teeth of the rotating drive gear and the driven gear in the first direction,
in response to detecting the first contact, starting the electric motor to rotate the drive gear from a stationary position to an opposite second direction,
detecting a second contact of teeth of the rotating drive gear and the driven gear in the opposite second direction,
measuring time or distance in the opposite second direction from the detected first contact to the detected second contact, and
estimating the backlash of the meshing pair of the drive gear and the driven gear based on the measured time or distance values.

7. The method as claimed in claim 1, wherein the monitoring comprises
determining a gear wear condition by comparing each measured backlash or statics of a plurality of the measured backlashes collected over time to a backlash reference, and
concluding a need for gear maintenance, if the comparison indicates a certain wear or backlash of the meshing pair of the drive gear and the driven gear, and optionally
providing a notification of the need for gear maintenance.

8. The method as claimed in claim 7, wherein the backlash reference comprises one or more of: a reference value, a reference range of values, and a reference distribution of values, a reference model, mean value, a value range, a maximum value, a maximum value range.

9. The method as claimed in claim 7, wherein the backlash reference is determined by a plurality of backlash value measurements, when the meshing pair of the drive gear and the driven gear is first time coupled to the electric motor.

10. The method as claimed in claimed in claim 1, wherein
the measuring and monitoring are performed by the electric drive, or
the measuring is performed by the electric drive, and raw or preprocessed measurement results are forwarded to a further processing entity for completing the monitoring, the further processing entity preferably comprising a local condition monitoring entity and/or a cloud-based condition monitoring server.

11. An electric drive, wherein
the electric drive is configured to drive an electric motor coupled to a meshing pair of a drive gear and a driven gear in an electric power train, wherein the drive gear is provided on a first gear shaft coupled to the electric motor and the driven gear is provided on a second gear shaft coupled to a mechanical load,
the electric drive is configured to measure a backlash of the meshing pair of the drive gear and the driven gear until a contact of teeth of the rotating drive gear and the driven gear during a plurality of startups of the electric motor during an operation of the electric power train, and
the electric drive is configured to monitor wear of the meshing pair of the drive gear and the driven gear based on a change in the measured backlash of the plurality of startups over time during the operation of the electric power train, or
the electric drive is configured to forwarding raw or preprocessed measurement results to a further processing entity for monitoring wear of the meshing pair of the drive gear and the driven gear based on a change in the measured backlash of the plurality of startups over time during the operation of the electric power train.

12. The electric drive as claimed in claim 11, wherein the further processing entity comprises one or more of a local condition monitoring entity and a cloud-based condition monitoring server.

13. The electric drive as claimed in claim 11, wherein the electric drive is a variable frequency drive or a servo drive.

14. The electric drive as claimed in claim 11, wherein the electric drive is configured to detect the contact of the of teeth of the rotating drive gear and the driven gear by detecting a change in at least one electrical quantity of the electric motor and/or the electric drive due to an increased torque caused by the contact.

15. The electric drive as claimed in claim 14, wherein the at least one electrical quantity includes one or more of: an electric power output to the electric motor; a current supplied to the electric motor; at least one motor phase current or a further electrical quantity derived or estimated therefrom; at least one motor phase voltage or a further electrical quantity derived or estimated therefrom; a motor torque; and a motor stator flux.

16. The electric drive as claimed in claim 14, wherein the electric drive is configured to determine a detection threshold or a detection reference for the at least one electrical quantity by measurements, when the meshing pair of the drive gear and the driven gear is first time coupled to and driven by the electric motor.

17. The electric drive as claimed in claim 14, wherein the electric drive is configured to determine a gear wear condition by comparing each measured backlash or statics of a plurality of the measured backlashes collected over time to a backlash reference, and configured to conclude a need for gear maintenance, if the comparison indicates a certain wear or backlash of the meshing pair of the drive gear and the driven gear, and optionally configured to provide a notification of the need for gear maintenance.

18. The electric drive as claimed in claim 14, wherein the backlash reference comprises one or more of: a reference value, a reference range of values, and a reference distribution of values, a reference model, mean value, a value range, a maximum value, a maximum value range.

19. The electric drive as claimed in claim 14, wherein the electric drive is configured to determine the backlash reference by a plurality of backlash value measurements, when the meshing pair of the drive gear and the driven gear is first time coupled to the electric motor.

20. A cloud-based condition monitoring server, wherein
   the cloud-based condition monitoring server is configured to receive raw or preprocessed measurement results from an electric drive driving an electric motor coupled to a meshing pair of a drive gear and a driven gear in an electric power train, wherein the drive gear is provided on a first gear shaft coupled to the electric motor and the driven gear is provided on a second gear shaft coupled to a mechanical load, the raw and preprocessed measurement results including a measured backlash of the meshing pair of the drive gear and the driven gear until a contact of teeth of the rotating drive gear and the driven gear during a plurality of startups of the electric motor during an operation of the electric power train, and
   the cloud-based condition monitoring server is configured to monitor wear of the meshing pair of the drive gear and the driven gear based on a change in the measured backlash of the plurality of startups over time during the operation of the electric power train.

* * * * *